Nov. 17, 1942.   E. A. HARRINGTON   2,301,915
CONTACT ARM WELDING
Filed Aug. 26, 1939   2 Sheets-Sheet 1
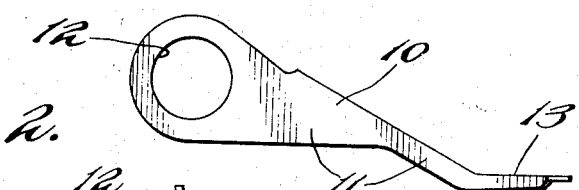
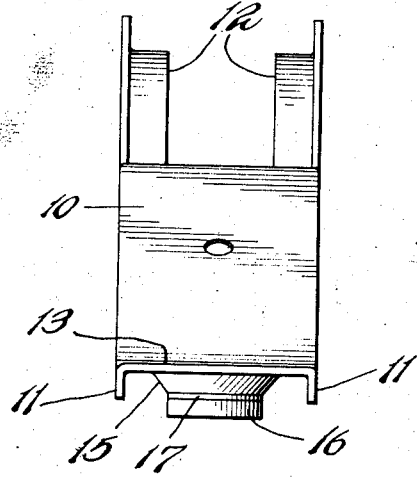
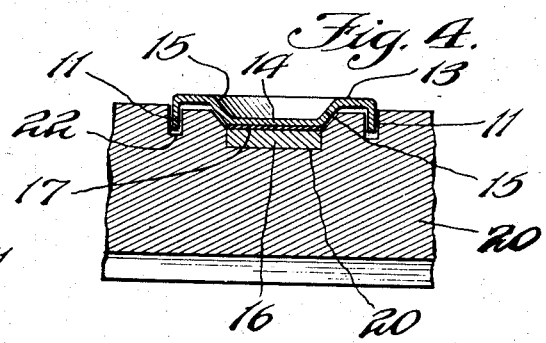
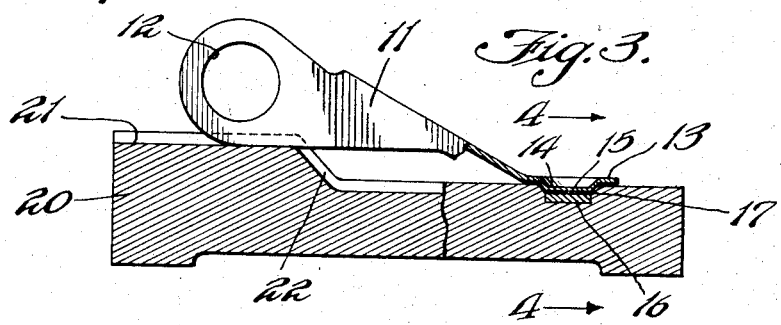
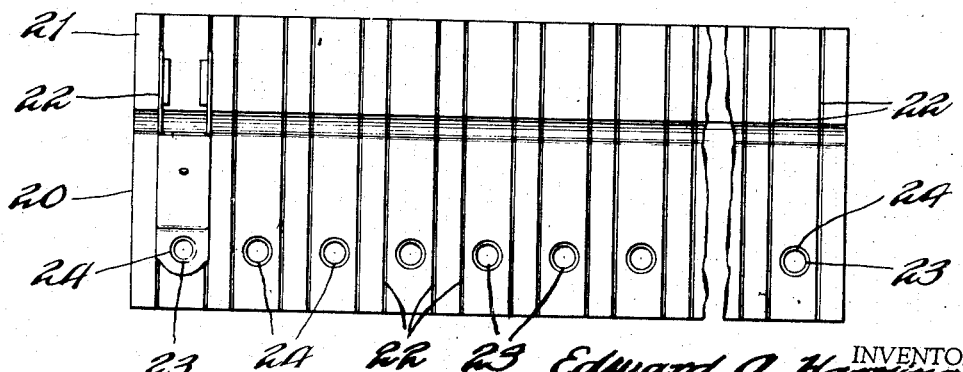
INVENTOR:
Edward A. Harrington
BY Kent W. Wonnell
ATTORNEY.

Nov. 17, 1942.   E. A. HARRINGTON   2,301,915
CONTACT ARM WELDING
Filed Aug. 26, 1939   2 Sheets-Sheet 2

INVENTOR:
Edward A. Harrington
BY Kent W. Wonnell
ATTORNEY.

Patented Nov. 17, 1942

2,301,915

UNITED STATES PATENT OFFICE 2,301,915

CONTACT ARM WELDING

Edward A. Harrington, Highland Park, Ill., assignor to Edward A. Harrington, Highland Park, Ill., as trustee Application August 26, 1939, Serial No. 292,058

3 Claims. (Cl. 113—112)

This invention relates in general to an ignition breaker arm with a tungsten or similar contact point welded thereon and to the method or process of such welding. An important object of the invention is in the provision of a contact disc which is accurately positioned and welded in place on an ignition breaker arm of ferrous metal.

A further object of the invention is in the provision of a new and improved method or process of welding a tungsten or other disc to an ignition breaker arm in an atmosphere of hydrogen.

A still further object of the invention is in the provision of improved means for accurately positioning a small contact disc with respect to portion raised or otherwise prepared for accurately receiving and locating a contact disc in engagement with the breaker arm to which it is attached as it passes through a welding operation.

A further object of the invention is in the provision of an improved welding process or method in which the breaker arm and the contacts are positively set and positioned with the arm bearing upon the contact and the welding disc positioned between the disc and the arm.

Other and further objects of the invention will appear hereinafter, the accompanying drawings illustrating the preferred and resultant construction of the contact arm in carrying out this improved method or process. In the accompanying drawings Fig. 1 is a side elevation illustrating an ignition breaker arm with a contact applied thereto;

Fig. 2 is an end view of the arm as shown in Fig. 1;

Fig. 3 shows the arm applied to a positioning block for welding;

Fig. 4 is a sectional view as taken on the line 4—4 of Fig. 3;

Fig. 5 is a top view of a positioning block;

Figure 6:
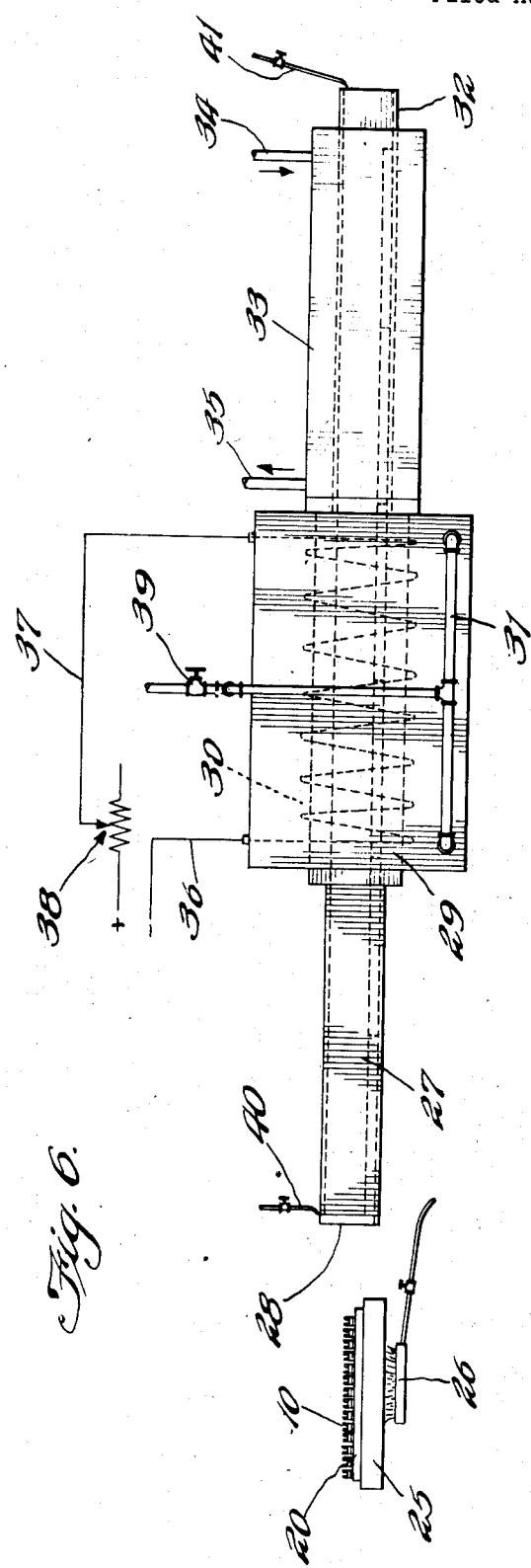
Fig. 6 is a side elevation.
Figure 7:
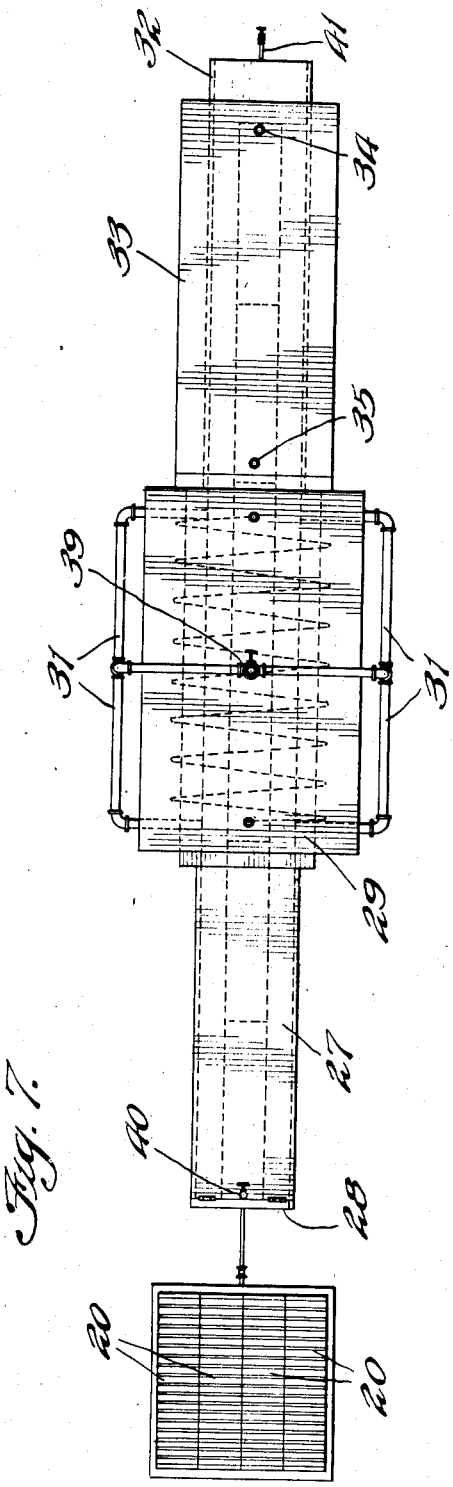
Fig. 7 is a top view of a hydrogen welding furnace for carrying out this process.

In this art it has long been the practice to apply a tungsten contact to a ferrous metal base by means of a uniting disc of cuprous metal in an atmosphere of hydrogen, relying upon the lower fusing point of the interposed disc of copper, or other metal to cause a centering action between the ferrous supporting portion and the tungsten disc. The practice of this method, however, is so inaccurate and so objectionable, resulting in such a large percentage of rejected breaker arms in which the contacts are off-side or inclined, that the present method was adopted of positively positioning the contacts and uniting discs in a block and in loosely positioning a contact arm on the block in inverted position with a raised contact surface bearing upon the welding disc, and with inclined sides to center and position the arm.

Referring now more particularly to the drawings this invention is described in connection with an ignition breaker arm 10 stamped and formed out of sheet steel and having bent sides 11 terminating in perforations 12 about which it is rotated. At the other or free end is a flat web portion 13 having a flat surface 14 struck up from the web and connected thereto by an angular rim 15 forming an inclined edge all around the flat surface 14.

This flat surface 14 may be of any desired shape such as square, round or hexagonal, but preferably is round and of substantially the same size as a disc 16 of contact metal such as tungsten. Interposed between the contact disc 16 and the surface 14 is a thin disc 17 of some metal such as copper, brass, or any suitable alloy, adapted to melt at a temperature below that of the arm or contact, and which when melted, will wet and therefore adhere to both the metal of the arm and the metal of the contact thereby welding and permanently securing them together.

By making the contact surface 14 substantially the same size as that of a disc with the sides 15 inclined away from the surface, the contact is more accurately centered upon the surface by the welding or fusing metal 17 and there is less tendency for the contact to become offset or inclined. Since any surplus of the fusing metal adheres to the inclined surface 15 it does not tend to draw the contact 16 in that direction thus justifying the inclined surface.

In the process or method of manufacturing these ignition breaker contact arms a plurality of blocks 20 are provided, usually made of carbon or some other heat resisting material not likely to be burned or consumed when placed in a welding furnace. Each block is formed with a raised portion 21 at one side and with transverse slots 22 extending across the top face in pairs spaced apart sufficiently to loosely receive the bent sides 11 of an arm therebetween. In the lower portion of the block between each pair of slots 22 is a recess 23 with an angularly inclined edge 24, the recess being of sufficient diameter to closely receive the disc 16 and also the disc 17 of welding material on top thereof, and the inclination of the angular edge 24 being substantially the same as the inclination of the inclined surface 15 so that when an ignition arm is inverted upon the block with the raised surface 14 disposed in the top of the recess 23, the inclined sides 15 engaging the inclined edge 24 of the recess will tend to center and positively position the raised contact surface 14 in engagement with the disc and contact holding them together and in the recess under the weight of the arm. The perforated end of the arm is supported by the raised portion 21 of the block so that the contact surface 14 will be parallel and in line with the surface of the contact 16, and the weight of this end of the contact arm is sufficient not only to hold the disc 16 and 17 together in the recess, but also since the edges 11 are loosely guided in the slots any slight jar or movement of the block, in placing it into, or moving it along in the furnace, tends to center and positively position the contact portion 14 with respect to the contact 16 and the disc of fusing metal 17, thereby insuring that the contact is properly welded in place.

In carrying out the welding process a number of blocks 20, each receives a dozen or more contact arms which are placed in a position thereon after first inserting discs 16 and 17 in the recess 23, the raised ends bearing loosely as above set forth upon the discs in their respective recesses.

The plurality of blocks 20 are preliminarily heated on a stove or plate 25 by means of a gas burner 26 to a temperature of approximately 400 degrees F. or slightly more.

The blocks are then inserted endwise into a furnace having a hydrogen atmosphere and comprising an entry tube 27 with a hinged closure 28 at the end; a heating portion 29 having an electrical heating coil surrounding it, and piped connections 31 for introducing hydrogen into the furnace at the ends of the heating portion; and a discharging tube 30 with a surrounding cooling jacket 33 serviced by inlet and outlet pipes 34 and 35.

The heating coil 30 has conductors 36 and 37 leading to a suitable current source supplied through the rheostat 38. The piping 31 extends from both sides of the furnace and is connected to a suitable source of supply through the valve 39. At the ends of the inlet and outlet tubes 27 and 32 are gas jets 40 and 41 kept burning while the furnace is in operation to insure that any hydrogen gas escaping from the central furnace will be ignited and burned as it escapes from the ends of the tubes.

An opening is continuous through the tubes and the furnace, and by inserting the blocks 20 one after the other in contact with each other, the blocks are pushed first into the furnace where the arms and contacts are welded, the burning of the hydrogen precluding the possibility of any oxygen being present to oxidize and impair the welding of the tungsten contact to the breaker arm. There the welding is continued for a sufficient time and the blocks are pushed through the tube 32 which has a cooling jacket, so that each time a new block is admitted at the entry, the blocks are advanced, and a block of welded arms can be removed from the discharge tube 32, thus making the process progressive and continuous.

After removal from the furnace the welded breaker arms are inspected to insure that there are no objectionable breaker ones, and after they have sufficiently cooled, the block is turned over, discharging the breaker arms into any suitable container, so that a block can then be refilled and reused.

In carrying out this process the welding operation is timed by the insertion and removal of the blocks, leaving them in the furnace several minutes where the temperature is sufficient to melt the fusing metal but not melting either the contact disc or the metal of the arm itself. In carrying out this process any slight jarring movement of the block tends more accurately to position the contact arms on the contacts since the contact end is loosely resting upn or supported by the discs 16 and 17 and this end with the arm is automatically centered by the engagement of the inclined portion 15 with the angular edge 14 of the recess as herein set forth.

The completed breaker arms are particularly free from defective centering and tilting of the contacts, resulting in a high percentage of usable arms and in a very small loss due to the rejected ones.

I claim:

1. The method of fusing or welding a tungsten contact disc by means of a fusing disc of lower melting point to a ferrous sheet metal ignition breaker arm having a raised contact surface of the same size as the discs at one end joined by an angular rim, and perforated mounting ears at the other end with side flanges at angles to the contact surface; which comprises closely positioning the tungsten disc in an upright opening of a holder with the fusing disc resting thereon, in engaging the angular rim joining the raised contact surface to the breaker arm, in loosely confining the breaker arm in inverted position with the contact surface resting flatly upon the fusing disc, in loosely supporting the flanges of the mounting ears in grooves of the holder at such an elevation above the fusing disc that the raised contact surface rests flatly upon the fusing disc, and in centering the contact surface with the discs by the engagement of the angular rim with the edge of the upright opening during the heating and welding operation.

2. The method of fusing or welding a tungsten contact disc by means of a fusing disc of lower melting point to a ferrous sheet metal ignition breaker arm having a raised contact surface of the same size as the discs at one end joined by an angular rim, and perforated mounting ears at the other end with side flanges at angles to the contact surface; which comprises closely positioning the tungsten disc in an opening at the top of a holder with the fusing disc resting thereon, in loosely confining the arm in inverted position with the raised contact surface resting upon the fusing disc, in loosely supprting the other end of the arm in raised position with the side flanges confined in grooves in the holder but permitting a limited movement of the breaker arm thereon, and holding the contact surface flatly in engagement with the fusing disc, and in positively centering the contact surface with the disc by engagement of the angular rim with the edge of the opening for movement with the holder during the fusing and welding operation.

3. The method of fusing or welding a tungsten contact disc by means of a fusing disc of lower melting point to a ferrous sheet metal ignition breaker arm having a raised contact surface of the same size as the discs at one end joined by an angular rim, and perforated mounting ears at the other end with side flanges at angles to the contact surface; which comprises closely positioning the tungsten disc in an opening at the top of a holder with the fusing disc resting thereon, in confining the arm in inverted position with the contact surface resting at one end upon the fusing disc, in loosely confining the other end of the arm by engaging the side flanges in parallel grooves at an elevation above the recess in the holder so that the contact surface will flatly engage the fusing disc, in centering the contact surface with the disc by engagement of the angular rim with the edge of the opening of the holder, in advancing the contacts and arms all in the same inverted position with the holder through a welding furnace in an atmosphere of hydrogen, and in removing and cooling the arms and contacts as welded together.

EDWARD A. HARRINGTON.